Figures 1, 2:
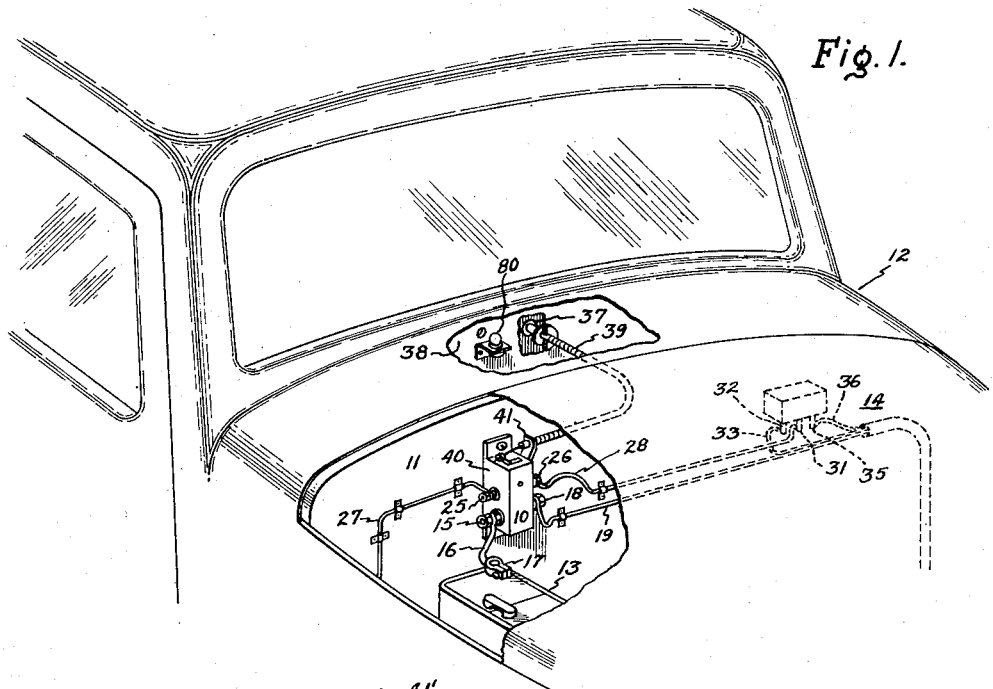

Jan. 16, 1951     R. MINCH ET AL     2,538,581
SAFETY CUTOUT SWITCH FOR ELECTRICAL SYSTEMS
Filed Oct. 26, 1948

Inventors
Raymond Minch
Ralph Ball
by Raymond A. Miles
Their Attorney

Patented Jan. 16, 1951

2,538,581

UNITED STATES PATENT OFFICE 2,538,581

SAFETY CUTOUT SWITCH FOR ELECTRICAL SYSTEMS

Raymond Minch, Watervliet, and Ralph Ball, Albany, N. Y.

Application October 26, 1948, Serial No. 56,566

7 Claims. (Cl. 171—97)

The invention relates to electric system safety cutout switches, particularly of the remote manually operable type suitable for disconnecting the battery from automobile electric systems.

The principal object is to provide an improved and easily installed form of remote manually operable self-locking master cutout switch mechanism capable of quickly and safely de-energizing the entire electrical system on automobiles or the like in case an operating emergency should suddenly arise or whenever it is desired when the car is parked or unattended to effectively isolate the ungrounded terminal of the battery and thereby insure against any unsafe release of the electrical energy stored therein through accidental grounds or shorts likely to start a fire or result in other difficulties.

With an increasing number of automobiles skidding or crashing into collisions and in other highway accidents, many disastrous fires and even deaths may result directly from the electrical system of the cars or trucks involved becoming grounded, shorted, or broken and igniting spilled gasoline, oil or other combustibles. In addition to the fires resulting from such highway accidents, many other inexplainable automobile fires inevitably are the result of shorts or grounds due to failure of the electrical system insulation even while the car or truck is standing parked on the street or unattended in the garage. This is particularly true with respect to the older cars or trucks on which the insulation of the wires, control switches, or other electrical parts inevitably have become worn or deteriorated to the point where a short circuit or ground is likely to occur at any time.

While a fire may not always result, still the car or truck may become temporarily disabled in case a stray ground or short circuit should develop in the electrical system. Thus, the horn may accidentally start sounding and cannot be stopped, with resulting embarrassment and eventual discharge of the battery. Similar stray high resistance grounds or insulation failures may spontaneously develop that will completely discharge the battery while the car is standing parked on the street or unattended in a garage without blowing the safety fuse or operating the automatic circuit breaker. The chances for such stray high resistance grounds or other battery discharge difficulties are materially increased as radios, fog lights, defrosting fans, cigar lighters, direction signals, and other accessories are connected carelessly or with inadequate wiring to any standard automobile electrical system of the type having energizing means including a storage battery having a grounded terminal and an ungrounded terminal and a charging generator provided with a field circuit.

Thus another object of the invention is to provide an improved form of self-locking electrical safety cutout switch mechanism having a remote manual operating handle readily accessible on the dash or in some other convenient place and capable not only of disconnecting the ungrounded terminal of the battery entirely from the electrical wiring system when the automobile is to be parked in order to insure against discharge of the battery due to stray high resistance grounds or other insulation failures such as noted above but also to interrupt the field circuit of the battery charging generator so as to effectively deenergize the entire automobile electrical system without blowing the lights in case of a sudden emergency while the car is operating and thus avoid the danger of fires resulting from traffic accidents.

Another object is to provide a signal lamp that is connected to indicate the presence of stray grounds or other insulation failures in the electric system upon each opening of the safety cutout switch.

Further objects and advantages of the invention will appear in the following description of the accompanying drawing wherein Fig. 1 is a perspective view partly in section showing a typical installation of the improved electric system safety cutout in an automobile and Fig. 2 is a sectional view of the safety cutout switch mechanism with the cooperating parts of the automobile electrical system diagrammatically illustrated interconnected therewith.

As shown in Fig. 1, the improved driver-operated safety cutout device may be readily mounted on the wall 11 between the engine compartment and the driver's compartment of the automobile 12 and interconnected so as to quickly and easily isolate the adjacent battery 13 from the automobile electric system indicated generally by the reference character 14. Thus the terminal 15 of the safety switch 10 readily is interconnected by a relatively short cable 16 with the ungrounded terminal 17 of the battery 13 and the opposite terminal 18 of the cutout switch is connected through the cable 19 to the usual starter switch 21 for the engine starting motor 22 as illustrated diagrammatically in Fig. 2. The upper pair of switch terminals 25 and 26 are readily connected by the conductors 27 and 28 into the circuit of the generator field winding 29 as also indicated diagrammatically in Fig. 2. The field circuit conductor 28, in accordance with the usual practice, is readily connected to the middle terminal 31 of a voltage regulator and protective relay which may be of the usual type. One of the outer regulator terminals 32 is connected by the conductor 33 to the usual automobile generator 34 that charges battery 13 and the other outer terminal 35 is connected by conductor 36 to the battery cable 19 as indicated in Fig. 2.

As shown in Fig. 1, the safety cutout switch 10 is provided with a remote operating handle 37 mounted on the dash 38 of the automobile or other location conveniently accessible to the driver with the operating handle 37 connected, preferably by means of a flexible push-pull forced transmitting wire 39 to operate the cutout switch 10.

As shown in the sectional view of Fig. 2, the cutout switch 10 is provided with a boxlike enclosing frame 40 having an arm 41 extending therefrom for mounting the enclosing sheath of the push-pull wire 39 therein by means of a suitable set screw 41'. A pair of opposite switch terminals 25, 26 are mounted in the opposite walls of the frame 40 by means of suitable insulating bushings and washers 42 and 43 and are respectively provided with the enlarged heads 46 and 47 for engagement with the movable field circuit interrupting switch member 48. The field circuit switch interrupting member 48 is mounted upon a reciprocating operating rod 49 with suitable insulating bushings and washers 50 interposed therebetween. The switch member 48 is held in a predetermined position on the rod 49 by means of the locking collars 51 and 52 that are respectively secured to the rod 49 by means of the set screws 53 and 54. A biasing spring 55 is interposed between the collar 51 and a frame cross member 56 through which the rod 49 slides so as to normally close the field circuit interrupting switch member 48 into engagement with the terminal heads 46 and 47 that serve as the stationary contacts of the switch.

The terminals 15 and 18 that are connected in the battery circuit are similarly mounted in the opposite walls of the switch frame 40 by means of suitable insulating bushings and washers 60, 61 and provided with the oppositely aligned enlarged heads 62 and 63 for circuit closing engagement with the movable battery circuit interrupting switch member 64. Since the current in the battery circuit is much greater than that in the field circuit and hence much greater contact pressure is required, the terminal heads 62 and 63 as well as the battery circuit interrupting switch member 64 preferably are tapered so as to provide for a high contact pressure wedging engagement therebetween as indicated in Fig. 2 of the drawing.

The battery circuit interrupting switch member 64 is slidably mounted upon the operating rod 49 by means of suitable insulating bushings and washers 66 and a relatively strong spring 67 is interposed between one of the insulated washers 66 and the bottom wall 40' of the switch frame 40 so as to exert a relatively strong biasing force to close the switch member 64 into high contact pressure engagement with the terminal heads 62 and 63 and thereby normally close the battery circuit.

The operating rod 49 carries a collar 70 pinned thereto for engaging with the opposite insulating washer 66 so as to move the battery circuit interrupting switch member 64 to the circuit opening position against the bias of the relatively strong biasing spring 67. The collar 70 is spaced relatively to the field switch member 48 on the operating rod 49 so that a sequential opening of the field switch 48 and the battery switch 64 is produced and thereby effect the opening of the field switch before the opening of the battery switch.

The movement of the operating rod 49 is produced by a rotatable cam member 72 that is pivoted upon a bearing shaft 73 extending between the opposite side walls of the boxlike switch enclosing frame 40 so as to engage the cam surface 74 with the upper end of the rod 49 that slides in the cross member 46 and the bottom member 40' of the frame to sequentially open the field and battery switches. The cam 72 is provided with a power amplifying operating lever arm 75 having a suitable screw clamp 76 at the end thereof for anchoring the push-pull wire 39' therein. Thus the force applied to the operating handle 37 is multiplied many times by means of the lever arm 75 and the cam action 72 so as to effectively overcome the combined force of the biasing springs 55 and 67 in sequentially opening the switches. The cam 72 is provided with a rounded, self-locking corner 77 formed so as to securely hold the rod 49 in its depressed position even though the handle 37 is pulled out and released. In this way the cam 72 becomes self-locking and serves to maintain both the field circuit interrupting switch member 48 and the battery circuit interrupting switch member 64 in the open position against the closing bias thereof.

When an automobile is equipped with the improved safety cutout switch mechanism of the present invention, all that the operator has to do to effectively insure against fires from an impending traffic accident is to pull the operating handle 37. This will first open the generator field circuit and then open the battery circuit so as to render the generator ineffective and then isolate the battery from the electrical system. Likewise if the car is parked or left standing unattended, simply pulling the handle 37 will effectively insure against the possibilities of shorts or grounds discharging the battery or causing any other difficulty while the car is unattended.

Furthermore, in accordance with the present invention, a signal lamp 80 may be connected across the terminals 15 and 18 of the battery circuit interrupting switch in order to cause the lamp 80 to light upon opening of the battery switch member 64 whenever a hidden or stray ground $g$ exists in the electric system 14 of the automobile. Thus if the light 80 fails to light upon opening of the switch 64, there is a reasonable certainty that the electrical system is in good operating condition. Moreover in case some accidental ground should cause the lamp 80 to light, the high resistance of the indicating lamp 80 will necessarily limit the current to such a relatively small value that the battery 13 is not likely to be discharged or any other difficulties result.

While the invention has been illustrated and described in the preferred form, it should be understood that it is not necessarily limited to the specific structure shown but may be carried out in other ways.

What we claim as new and desire to secure by Letters Patent of the United States is:

1. A driver-operable safety cutout device for automobile electric systems of the type having energizing means including a storage battery and a charging generator therefor provided with a field circuit comprising in combination a normally closed generator field circuit interrupting switch, a normally closed battery isolating switch, and sequential mechanism for opening said field switch before opening said battery isolating switch and having a remote operating handle connected to be mounted accessible to the driver.

2. A driver-operable safety cutout device for automobile electric systems of the type having energizing means including a storage battery and a charging generator therefor provided with a field circuit comprising in combination a normally closed generator field circuit interrupting switch, a normally closed battery isolating switch, and sequential operating mechanism therefore having relatively spaced jointly movable elements for opening said field switch before opening said isolating switch and a remote operating handle flexibly connected to be mounted accessible to the driver and provided with power amplifying means for jointly moving said elements.

3. A driver-operable safety cutout device for automobile electric systems of the type having energizing means including a storage battery and a charging generator therefor provided with a field circuit comprising in combination a normally closed generator field circuit interrupting switch, a normally closed battery isolating switch, and a self-locking cam-operated sequential mechanism for opening said field switch before opening said battery isolating switch and having a remote operating handle flexibly connected with the operating cam to be mounted accessible to the driver.

4. A driver-operable safety cutout device for automobile electric systems of the type having energizing means including a storage battery and a charging generator therefor provided with a field circuit comprising in combination a generator field circuit interrupting switch member having a spring normally closing the member, a normally closed battery isolating switch member having a spring normally closing the member and sequential operating mechanism therefore having an operating member provided with relatively spaced jointly-movable elements for opening said field switch before opening said isolating switch and a remote operating handle flexibly connected to be mounted accessible to the driver and provided with power amplifying cam means for moving said operating member to overcome the closing force of said biasing springs.

5. A driver-operable safety cutout device for automobile electric systems of the type having energizing means including a storage battery and a charging generator therefor provided with a field circuit comprising in combination a generator field circuit interrupting switch having a spring normally closing the switch, a battery isolating switch having a spring normally closing the switch, sequential mechanism for opening said field switch before opening said battery isolating switch, means including a rotatable cam for operating said mechanism, and a remote operating handle flexibly connected with the cam to be mounted accessible to the driver, said cam having a self-locking flat portion for holding both switches open against the bias of the closing springs when the operating handle is released.

6. A driver-operable safety cutout device for automobile electric systems of the type having energizing means including a storage battery and a charging generator therefor provided with a field circuit having in combination a generator field circuit interrupting switch having a reciprocating perforate switch member provided with a biasing spring for normally closing the switch member, a battery isolating switch having a perforate switch member reciprocating in alignment with the field switch member and provided with a spring for normally closing the switch member, sequential operating mechanism for said aligned switch members including a reciprocating rod extending through the switch members and provided with relatively spaced elements for opening said field switch before opening said isolating switch, a pivotally mounted cam for reciprocating said rod and having a power amplifying lever arm extending from the cam, and a remote operating handle having a flexible cable connection with the lever to be mounted accessible to the driver.

7. A driver-operable safety cutout device for automobile electric systems of the type having energizing means including a storage battery having a grounded terminal and an ungrounded terminal and a charging generator provided with a field circuit comprising in combination a normally closed generator field circuit interrupting switch, a normally closed isolating switch for the ungrounded battery terminal, sequential operating mechanism for opening said field switch before opening said isolating switch and having a remote operating handle flexibly connected to be mounted accessible to the driver, and a signal lamp connected in shunt with the battery isolating switch for indicating grounds in the electric systems when the isolating switch is opened.

RAYMOND MINCH.
RALPH BALL.

REFERENCES CITED

The following references are of record in the file of this patent:

UNITED STATES PATENTS

| Number | Name | Date |
|---|---|---|
| 1,058,200 | Scott | Apr. 8, 1913 |
| 1,244,110 | McNary | Oct. 23, 1917 |
| 2,164,175 | Frank | June 27, 1939 |
| 2,409,885 | Monori et al. | Oct. 22, 1946 |
| 2,439,634 | Robey | Apr. 13, 1948 |